March 28, 1961 R. F. MALLINA 2,977,125
REPEATING MECHANISM
Filed Jan. 16, 1959
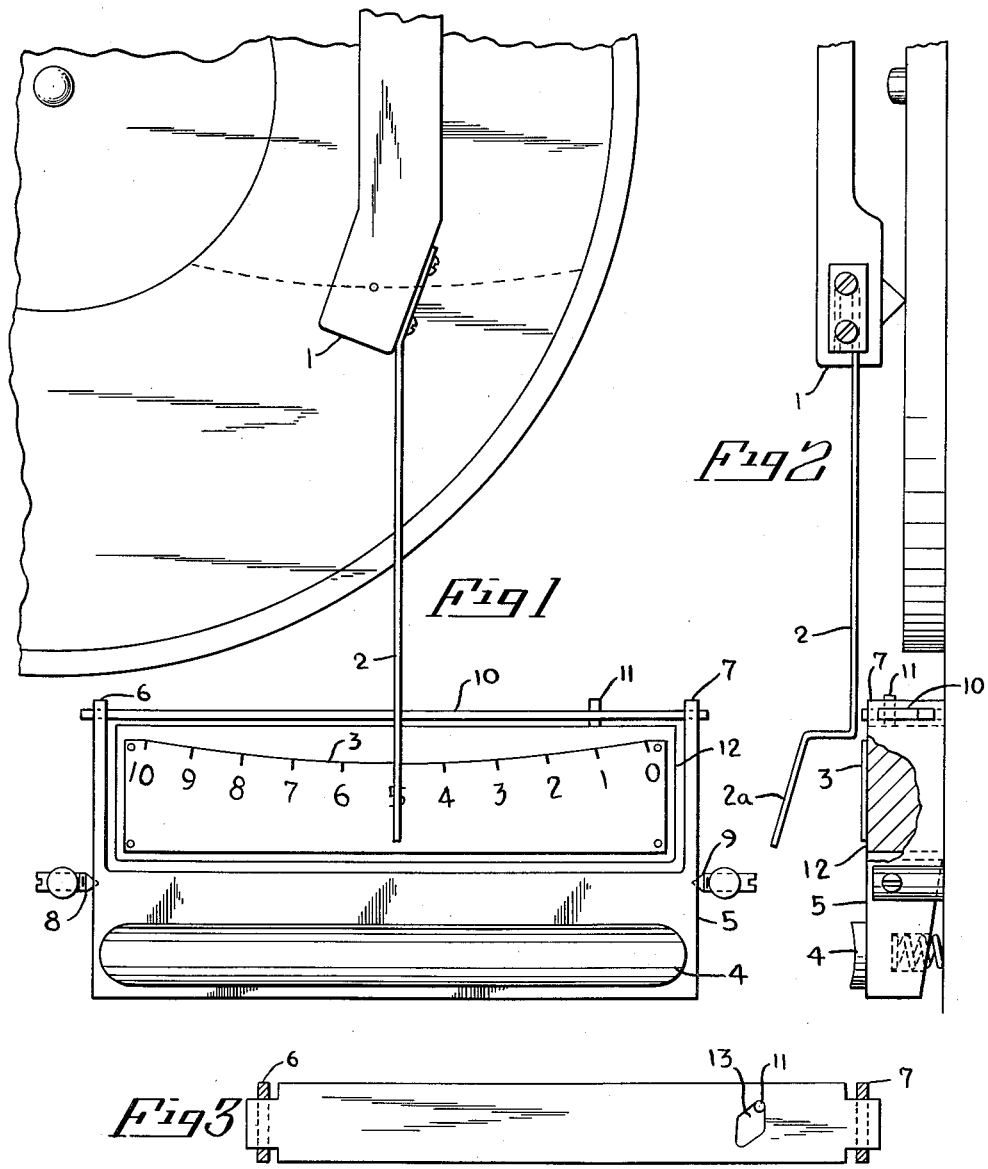
INVENTOR:
RUDOLPH F. MALLINA,
BY
HIS ATTORNEY United States Patent Office 2,977,125
Patented Mar. 28, 1961

2,977,125
REPEATING MECHANISM
Rudolph F. Mallina, Hastings on Hudson, N.Y., assignor to Thompson Ramo Wooldridge Inc., Cleveland, Ohio, a corporation of Ohio
Filed Jan. 16, 1959, Ser. No. 787,308
4 Claims. (Cl. 274—14)

In the study of foreign languages, speech, drama, etc. by phonograph it is customary that the student first listens to a sentence, or a word, and then repeats it. There is always a silent portion on the record which gives the student time to pronounce that which he has heard. It is also customary that the student reads in a book the words he hears. Sometimes he reads not only the foreign text in the book but also the English translation. His sense organs are therefore occupied in four directions.

As long as the words are simple to read and to pronounce he can proceed in this way satisfactorily. There are many occasions, however, when he is in doubt whether he understood the words correctly. It is natural then that he wants to hear the last sentence once more. When words are difficult to pronounce he may want to hear the sentence several times before he goes ahead.

In such instances, the student has two choices: he can play the record to the end and dismiss the portions he could not understand or he can pick up the sound reproducer and place it again on the record a few grooves back. This operation seems simple enough, but in reality it is not. In most cases it is necessary to go back only one groove, but invariably the student, whose mind is occupied with other things, goes back too far. He then has to listen to sentences in which he is no longer interested. If in the course of one lesson he has to repeat many times, these manual operations become a distraction.

The object of this invention is to provide means whereby the student needs only to depress a pushbutton or a bar. This operation causes the sound reproducer to be placed one or several grooves back. In general, one groove is sufficient, but if he desires to go back further he simply depresses the bar two or three times. In essence this is the same operation which is performed on a typewriter when the back-spacer key causes the carriage to move back one or several characters.

A further object of the invention is an extension of the tone arm. A pointer on the tone arms moves across a scale which indicates the portion of the record being reproduced. The numbers on the scale correspond to analogous numbers along the sentences in the book, so if the student desires to go back further than our one or two grooves, say 10 grooves, he simply lifts the extension of the tone arm and moves it back manually to the number on the scale from which he wants to repeat.

With an arrangement as described above, it is possible to release the student from any complex manual operations which might divert his mind from the three important functions, namely, Listening, Speaking, Reading.

A modification of the arrangement described above would be to have the book attached to the scale, the printing being so arranged that the numbers of the scale and the numbers on the margin of the book are on the same line. Essentially this means that the numbers may be eliminated and the extension of the phonograph arm points directly to the sentence.

Description of repeating device

Fig. 1 is a plan view of a phonograph reproducer and of a section of the associated turntable. Fig. 2 is a side view of reproducer and turntable. The reproducer head is provided with an extension arm 2 which, as shown in the plan view, is capable of moving across a scale 3. The scale 3 is numbered from 0 to 10. This, then, means that there are ten bands on the phonograph record, each band containing several sentences or words. Associated with the record may be a book whose sentences are marked on the margin of the page to correspond to the sentences on the record. By this arrangement it is possible to locate any portion of the record from the text of the book. The forming of the end of the extension 2a (as shown in Fig. 2) makes it possible to insert the finger between extension 2a and scale 3 and lift and replace the tone arm with ease.

To repeat a sentence, that is to move the reproducer back one or two grooves, the student depresses the Repeat bar 4. The repeat bar 4 is part of lever 5 and its extensions 6 and 7. Lever 5 is pivoted at 8 and 9. When the repeat bar is depressed the extension arms 6 and 7 rise. Fig. 3 shows the lift bar 10 is so designed that it can slide sideways in arms 6 and 7. By these means the lift bar 10 is then capable of moving up and down as well as sideways. It is, therefore, possible to first lift the extension 2, then move it to the right, then lower it until the reproducer 1 is engaged in the groove. After this operation is accomplished the bar 10 moves to the left, which is its normal position.

The manner in which this compound motion is obtained is shown in Figs. 4, 5, 6, 7, and 8. The motion of the bar 10 is produced by a pin 11 (Fig. 3) which is mounted on the stationary block 12 (Fig. 2). An opening 13 in bar 10 (Fig. 3) forms a cam contour which moves along the surface of the pin 11. To understand the compound motion of the lift bar 10, its position relative to the pin is shown in five figures. Fig. 4 is the normal position of the bar. When the repeat bar is depressed the lift bar 10 first moves to the position shown in Fig. 5. This motion may be in the order of, say, $\frac{1}{10}''$. The reproducer 1 is now lifted off the record and therefore no longer engaged in a groove. Depressing the repeat bar still further lifts the bar 10 still higher, say another $\frac{1}{10}''$. During this motion the bar is not only lifted but also cammed to the side as shown in Fig. 6. If this side motion amounted to, say, .30" the needle point of the reproducer 1 would be moved back somewhat less than .030", say, .020". This means then that the ratio of the distance from the tone arm pivot to the needle and the distance from tone arm pivot to bar 10 is as 2 to 3. When the repeat bar is now released, the lift bar 10 assumes first the position of Fig. 7 and then that of Fig. 8. Fig. 8, as will be noted, is again the normal position of the bar 10 (same as Fig. 4). Depressing and releasing the repeat bar means then that we have placed the reproducer one groove back. The student can, therefore, hear once more what was said on this groove.

For certain cases it may be desirable to move the reproducer back two or several grooves. Inasmuch as the bar 10 has considerable length it may contain several openings 13. All that is necessary to go to another cam is to unscrew pin 13 from its present position and to screw it into another position.

I claim:
1. In a repeat mechanism, for use in connection with a sound reproducer machine having a movable sound carrier and a movable arm positioned above the carrier to reproduce sound therefrom, the combination of an extension secured to said arm and projecting beyond the orbit of said sound carrier, a crossbar positioned outside the path of said carrier and disposed below said extension, means suspending said crossbar comprising a stationary base, a support tiltably journalled on said base and laterally slidably holding said crossbar, said support being manually tiltable for raising said crossbar to lift said extension, said crossbar with said support being operable to be lowered by gravity upon manual release for releasing said extension, and a pin and slot connection between said base and said crossbar guiding the crossbar upwardly and laterally and downwardly, said slot having a rhomboid shape including two opposite vertical straight edges guiding the raising and lowering of the crossbar and two opposite inclined edges parallel to each other and disposed between the vertical edges and operable to guide the crossbar through opposite lateral shifting movements, whereby said crossbar will first be raised upon manual tilting of said support and thereby will lift said extension, will subsequently be displaced laterally in the raised position and thereby will shift said extension sidewardly of the carrier, will thereafter be lowered upon manual release and thereby will release for lowering said extension at a point laterally shifted from the point at which the extension had been lifted, and will subsequently be returned laterally to its initial position.

2. In a repeat mechanism, for use in connection with a sound reproducing machine having a movable sound carrier and a movable arm positioned above the carrier to reproduce sound therefrom, the combination of an extension secured to said arm and projecting beyond the orbit of said sound carrier, a crossbar positioned outside the path of said carrier and disposed below said extension, means suspending said crossbar comprising a stationary base, a support tiltably journalled on said base and laterally slidably holding said crossbar, said support being manually tiltable for raising said crossbar to lift said extension, said crossbar with said support being operable to be lowered by gravity upon manual release for releasing said extension, and cam and cam follower means between said crossbar and said base guiding the crossbar upwardly and laterally and downwardly, said cam means comprising an endless cam having two opposite vertical cam surfaces for the raising and respectively lowering of the crossbar and, between the same, two opposite inclined cam surfaces for the lateral opposite shifting of said crossbar, whereby said crossbar will first be raised upon manual tilting of said support and thereby will lift said extension, will subsequently be displaced laterally in the raised position and thereby will shift said extension sidewardly of the carrier, will thereafter be lowered upon manual release and thereby will release for lowering said extension at a point laterally shifted from the point at which the extension had been lifted, and will subsequently be returned laterally to its initial position.

3. In a repeat mechanism, as claimed in claim 2, together with a scale mounted on said base and cooperating with said extension to indicate the extent of lateral displacement of the arm.

4. In a repeat mechanism, as claimed in claim 2, said cam including a rhomboid slot defined in said crossbar, said cam follower including a pin mounted on said base and engaging said slot.

References Cited in the file of this patent
UNITED STATES PATENTS
1,343,087     Peremi _____ June 8, 1920